(12) United States Patent
Gabes

(10) Patent No.: US 6,811,056 B2
(45) Date of Patent: Nov. 2, 2004

(54) DEVICE FOR SUPPLYING A FLUID AND FOR RECOVERING SAID FLUID IN THE SAME SPACE

(76) Inventor: André Gabes, 7 rue de la Mare, 60800 Trumilly (FR)

( * ) Notice: Subject to any disclaimer, the term of this patent is extended or adjusted under 35 U.S.C. 154(b) by 0 days.

(21) Appl. No.: 10/480,307

(22) PCT Filed: Jun. 15, 2001

(86) PCT No.: PCT/FR01/01865

§ 371 (c)(1),
(2), (4) Date: Apr. 19, 2004

(87) PCT Pub. No.: WO02/102676

PCT Pub. Date: Dec. 27, 2002

(65) Prior Publication Data

US 2004/0155060 A1 Aug. 12, 2004

(51) Int. Cl.[7] .............................................. B65D 25/04
(52) U.S. Cl. .......................... 222/103; 222/94; 222/95; 222/108; 222/608; 222/386; 222/387
(58) Field of Search .................. 222/95, 105, 108, 222/608, 386, 386.5, 387, 94, 103

(56) References Cited

U.S. PATENT DOCUMENTS

| | | | |
|---|---|---|---|
| 720,902 A | * | 2/1903 | Du Brau ........................ 222/95 |
| 1,377,630 A | * | 5/1921 | Royster ....................... 222/108 |
| 1,706,213 A | * | 3/1929 | Cordley ....................... 222/108 |
| 2,119,383 A | * | 5/1938 | Cornelius .................... 222/108 |
| 3,790,032 A | * | 2/1974 | George .................... 222/146.1 |
| 3,904,079 A | * | 9/1975 | Kross .......................... 222/108 |
| 3,931,907 A | | 1/1976 | Henle |
| 3,940,019 A | * | 2/1976 | Kross et al. ................. 222/108 |
| 4,077,544 A | * | 3/1978 | Malacheski et al. .......... 222/95 |
| 4,871,452 A | * | 10/1989 | Kohler et al. ............... 210/167 |
| 5,462,201 A | * | 10/1995 | Wilkins ........................ 222/95 |
| 5,553,749 A | * | 9/1996 | Oyler et al. ............. 222/129.1 |
| 5,915,602 A | * | 6/1999 | Nelson ........................ 222/608 |
| 2001/0002236 A1 | * | 5/2001 | Mohr et al. ................. 417/118 |

FOREIGN PATENT DOCUMENTS

| | | | | |
|---|---|---|---|---|
| DE | 3110153 A1 | * | 5/1982 | ........... B65D/88/16 |
| DE | 3146533 A1 | * | 6/1983 | ........... B65D/90/04 |
| EP | 93197 A2 | * | 11/1983 | ............. A45F/3/16 |

* cited by examiner

Primary Examiner—Kenneth Bomberg
(74) Attorney, Agent, or Firm—Stites & Harbison PLLC; Marvin Petry

(57) ABSTRACT

Device designed to supply water to aircraft galleys. The device operates simply, autonomously and independently and is provided with a simple structure. The device comprises a system which supplies a quantity of pressurized water from bladder tank of a container, consisting of a receptacle and a cover, and which recovers an equivalent or greater quantity of contaminated water in bladder tank of the same container. In this way, there is no longer an outflow of water. The device requires no electrical or pneumatic pump. The pressure in the water circuit is generated by the spring which is compressed in the container when bladder tank is being filled with drinking water and which acts on the piston, which in turn compresses the bladder tank. The water circuits are reduced to a minimum. The device is installed in a pressurized area and eliminates all frost-related risks.

15 Claims, 1 Drawing Sheet

DEVICE FOR SUPPLYING A FLUID AND FOR RECOVERING SAID FLUID IN THE SAME SPACE

FIELD OF THE INVENTION

The invention relates to a hydraulic device, situated in a detachable container, designed to supply and distribution of pressurized stored liquid and its recuperation in the same volume.

BACKGROUND OF THE INVENTION

This process is found in a container sealed and pre-filled, easily interchangeable, which needs no energy and totally autonomous, assuring a dynamic pressure necessary to the circulation of the liquid. This container is reusable, clean and not bulky, as compared for example, to the circuits for supply of water usually found on airplanes.

In general, the water circuit system on business planes is composed of:

- fixed tanks, filled under pressure or by gravity;
- electrical pumps enabling a constant flow to the tap;
- pipes permitting the discharge of wastewater outside;
- drainage masts, some of them heated, supposed to avoid the formation of ice.

These water circuits cross through frames, non pressurised or non-conditioned zones like under the floors of the cockpit and cause, in case of leak or breakdown, long and dumps costly, leaving also the airplane immobilized. The electrical systems are composed of thermostatic sensors and resistances which characterize the complexity thereof inducing such problems of reliability sometimes, and which bring out real risk linked with frost. Furthermore, problems of noise appear from depressurisation when discharging wastewater outside (in the atmosphere).

SUMMARY OF THE INVENTION

The main object of this invention is, therefore, to bring an autonomous and independent solution of structure simple and silent functioning which minimises the volume of storage of drinkable water and wastewater.

This invention comprises a container enveloping two extensible and compressible tanks separated by a piston disc. The inferior tank contains liquid destined for the user. The superior tank recuperates the wastewater, and proposes, in fact, at least an equal volume, or even superior. The piston disc compresses the inferior tank against the walls of the container, with the help of a spring, arranged in the superior tank, thus creating a pressure on the membrane of the tank containing the liquid to be supplied.

In the inferior part, the tank is linked, through the container to a rigid pipe by a cross coupling. This connection which enables a rapid dismantling of the elements comprises near the coupling: on one hand a replenishment valve (allowing the replenishment at a given pressure), and on the other hand a rigid canalisation, which can be equipped with a pressure regulator, ending up by a quick connecting system to a supply circuit.

The volume of liquid expelled in the supply circuit is recuperated, after its use, in the superior tank whose volume increases in the same proportion.

The installation of the container requires: the connection to the supply circuit and the connection to the drainage system.

At the time of coupling the container by a quick coupling, the drainage pipe opens a non return valve situated in the superior part of the tank. At the time of disconnection, this valve, pushed by the spring, assures water tightness during manipulations.

After use, the container is removed so as to allow its discharge, cleaning and replenishment and to be used again. After overturning the container, emptying can be done without dismantling, by pressing on the pointer of the valve allowing the flow of recuperated liquid.

The lid, covering the superior part of the container locks and unlocks by a quick system. Its withdrawal enables access to all inner elements of the container such as: tanks, springs, pistons so as to allow necessary conditioning interventions for a new use.

This device can be used according to the needs, in all sanitary fittings including sinks or furniture equipped with sinks whatever the model of the airplane. It is, however, possible to add to it a level control system.

BRIEF DESCRIPTION OF THE DRAWINGS

The diagrams (FIGS. 1, 2, 3), illustrate an embodiment of the device, showing three phases of a container distributing and recuperating water given as a non-limiting example.

DETAILED DESCRIPTION OF THE PREFERRED EMBODIMENTS

Figure 1:
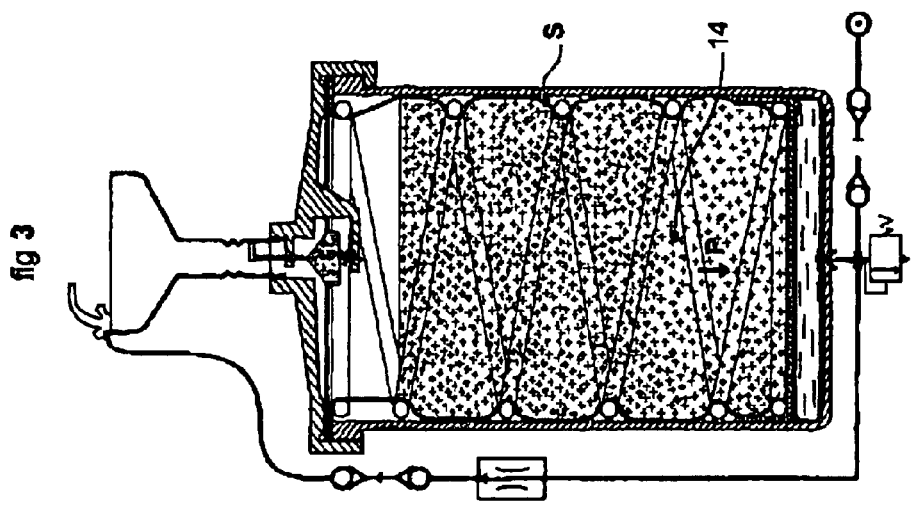

The three figures show a container consisting of a body (1) principal recipient, which is closed by a lid (2) and contains the inferior tank (1) and the liquid (5), the spring (4) and the superior tank (S).

When the container is connected to the drainage system at the lid level (2), the pipe (13) of the drainage pipe is engaged and locks in the orifice of the lid, the pipe (13) rests on the pointer of the valve (6) equipping the lid and thus allows its opening.

The piping (10) enabling distribution can be provided with a pressure regulator (11), is extended by a quick coupling (12). At the time of installation, the device is connected to the clean circuit of the tap by quick coupling (12) which is equipped with a non return valve. This device can be completed by a shut-off valve (not represented).

Referring to FIG. 1, the inferior tank (1) is filled up with the supplying liquid (5) under pressure (P) provided by the piston disc (3) under the effect of the spring (4).

Pressure (P) exercised by the compressed spring is superior to the use pressure and necessitates a regulator (regulator 11)

The piping (10) is connected to the tank (1) by a cross coupling (7) on which the overpressure valve (9) is set, useful during replenishment of the tank. This valve protects the spring from a pressure which can damage it. When it opens, allowing water to flow through, it indicates that the maximal volume of replenishment is attained. The cross coupling (7) is also provided with a quick coupling (8) which allows the filling of the tank (I) by connecting to a pressurized source, for example a public water network supply.

The empty inferior tank (S) already offers a free volume which enables the recuperation of an additional quantity (limited) compared to the volume of liquid contained in the tank (I).

Figure 2:
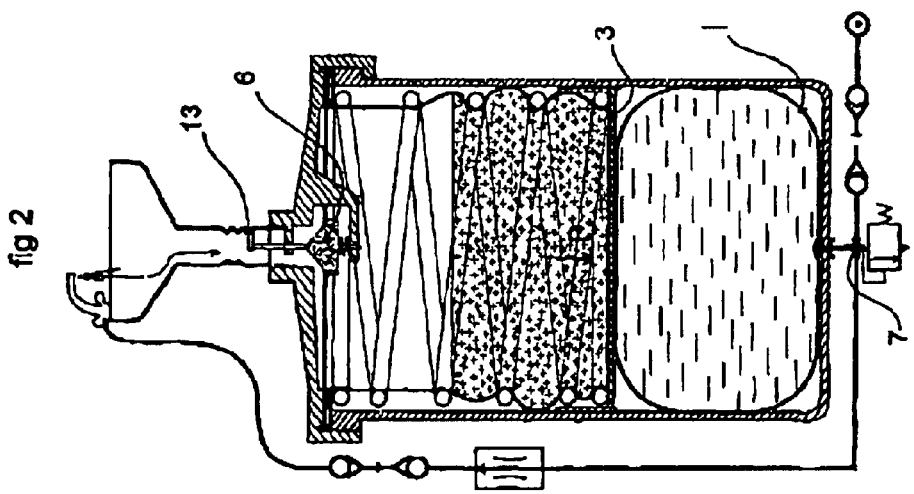

Referring to FIG. 2, when a user opens the tap of the sink, wastewater (14) is recuperated in the lank (S). This tank is a flexible sleeve shaped as an open bag whose neck forms a retaining wall reinforced inside by a framework moulded in the envelope. This retaining wall serves as seal plan between the lid (2) and the body (1) of the container and assures water tightness between them. When using water, the tank (I) discharges its drinkable water, the spring extends and compresses the tank (I) by means of the piston disc (3). This pressure (P) diminishes but remains superior to the pressure used. The volume of water in the tank (S) increases in proportion equal or inferior to water volume used in the tank (1).

Figure 3:
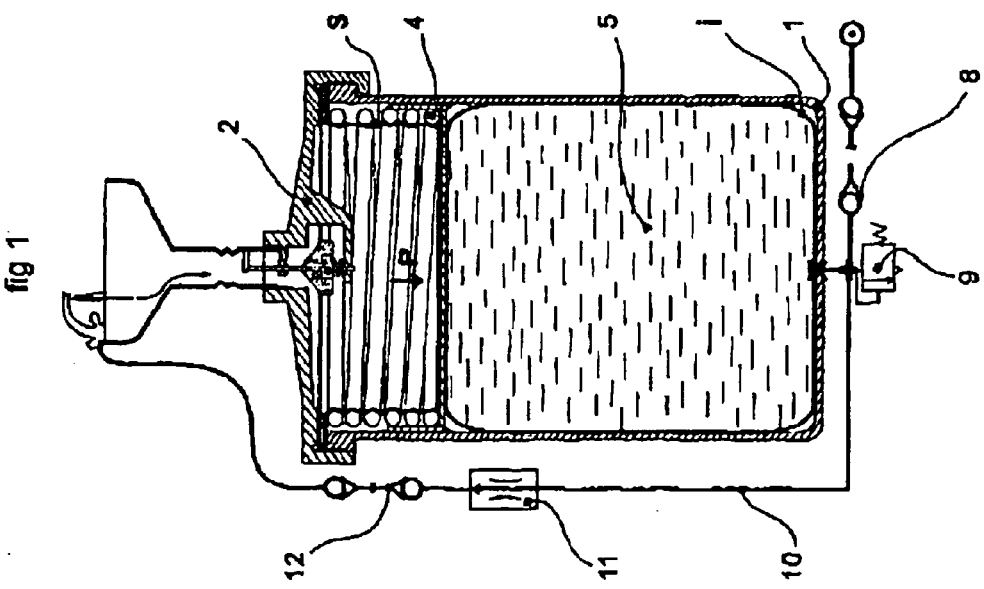

Referring to FIG. 3, the inferior tank (I) is empty, the pressure (P) is inferior to the use pressure, the regulator (11) prevents the flow of water, the tank (S) is fill of wastewater.

The removal can take place. The coupling (12) equipped with a non return valve is disconnected first, then the drainage pipe (13) which drives the closure of the orifice of the lid (2) by the valve (6) and therefore assures water tightness of the tank (S). The replacement of the container can be done, even in flight, if necessary.

The emptying of the container is done by overturning it, then by pressing on the pointer of the valve in a delivery sink, so that it opens and liberates its contents of wastewater. Once the emptying is done, the lid (2) can be opened, the tank (S) can be taken out in order to either cleaning it or replacing it, the spring (4) and the piston (3) can be removed, then the tank (I) can be disconnected and removed out (either to clean or to exchange it).

The conditioning of the container is realized by connecting the tank (I) through to the body (1) to the cross coupling (7), by installing the piston disc, the spring and the superior tank (S), then by locking the lid (2). The replenishment of the tank (I) is done by connecting the quick coupling (8) to a source of pressure and ends up by the opening up of the overpressure valve.

Extension of this process can be applied to all vehicles like camping car or others, in which the place reserved to the recuperation of wastewater is small. In aeronautic, this system enables to develop a network of specialised service in the distribution, maintenance, manipulation and re-use. This rapid service, provides a quality performance at low cost.

In preferred embodiment, the hydraulic device designed to supply a liquid and recuperation of said liquid after use in this same device in a autonomous way, comprises a flat or cylindrical container formed by a recipient (1) and a lid (2), including two tanks, a superior tank (S) which could be bigger than an inferior tank (I), said tanks being separated by a disc (3) which compresses the inferior tank (I), a spring (4) which exerts a pressure (P) on the inferior tank (I) by pressing on the disc (3), a quick and water tightness mode of connection enabling its connection and disconnection formed by a coupling (7), a piping (10), a quick coupling (12) for distribution and a non return valve (6) arranged on the lid (2) for the discharge, and means for replenishment of the inferior tank (I) comprising the coupling (7) which includes of a non return valve (8) and an overpressure valve (9), which can be provided with a regulator pressure (11).

In this device the elements (I) (S) (3) (4) are included in water tight container formed by (1) and (2). The superior tank (S) has a greater capacity than the inferior tank (I). The tank (I) contains a supplying liquid (5) and in that the tank (S) contains recuperated liquid (14). The supplying liquid (5) is stored under pressure (P).

The disc element (3) located between the inferior tank (I) and that the superior tank (S) exerts the pressure (P) provided by the spring (4) on the inferior tank (I) in an homogenous way. Whatever the form of the container, spring element (4) of variable shape exerts a constant pressure on the disc (3) which, by transmitting it to the tank (I), enables the dispatch of under pressure liquid in the distribution circuit. This pressure diminishes gradually as the liquid is distributed (5).

The tank (I) which is made of an elastic substance, tight, and which is balloon like shaped, is fixed up at the level of the bladder through a passage situated in the inferior part of the container (container 1).

The coupling (7) links the tank (I), through its bladder and the passage (1) to the distribution piping (10) to the over pressure valve (9) and to the non return coupling (8).

The circuit of distribution, constituted of a distribution sluice, a pressure regulator and a piping allows a regular flow when the tap is opened.

The recuperation of used or added liquid, is done by gravity through evacuation ducts leading to the hose (13) inserted in the orifice of the lid (2), in the superior tank (S), by increasing the volume, which takes the place of the expulsed volume from the inferior tank (I).

The lid (2) has a form and a structure including of an orifice in which is connected the hose (13), a support where a valve (6) is fixed up and a quick lock system on the body (1) providing access to different elements of the container.

The non return valve (6) sealing the orifice of the lid (2) has a pointer which enables its opening and its closure. This pointer enabling the liquid (14) to penetrate into the tank (S), being pushed by the hose during connection thereof with the lid, and enables the emptying of the superior tank (S), when the container is detached, being pushed by the far end of the receiving tank after turnover.

The body (1) has an orifice in its inferior part, through which the bladder (I) is fixed, and a neck in its superior part to provide a support to put into position the tank (S) and a lock means system with the lid (2).

The replenishment of the inferior tank (I) is done by connecting to the coupling (8) a source of liquid under a pressure superior to (P). Replenishment is attained when the over pressurized valve (7) opens up to let surplus liquid slip out.

What is claimed is:

1. Hydraulic device designed to supply a liquid and recuperation of said liquid after use in this same device, in a autonomous way characterized in that it comprises a flat or cylindrical container formed by a recipient (1) and a lid (2), including two tanks, a superior tank (S) which could be bigger than an inferior tank (I), said tanks being separated by a disc (3) which compresses the inferior tank (I), a spring (4) which exerts a pressure (P) on the inferior tank (I) by pressing on the disc (3), a quick and water tightness mode of connection enabling its connection and disconnection formed by a coupling (7), a piping (10), a quick coupling (12) for distribution and a non return valve (6) arranged on the lid (2) for the discharge, and means for replenishment of the inferior tank (I) comprising the coupling (7) which includes of a non return valve (8) and an overpressure valve (9), which can be provided with a regulator pressure (11).

2. Device, according to claim 1, characterized in that the elements inferior tank (I) superior tank (S) disk (3) spring (4) are included in water tight container formed by recipient (1) and lid (2).

3. Device according to claim 1, characterized in that the superior tank (S) has a greater capacity than the inferior tank (I).

4. Device according to claim 1, characterized in that the tank inferior (I) contains a supplying liquid (5) and in that the tank superior (S) contains recuperated liquid (14).

5. Device according to claim 1, characterized in that the supplying liquid (5) is stored under pressure (P).

6. Device according to claim 1, characterized in that the disc element (3) located between the inferior tank (1) and that the superior tank: (S) exerts the pressure (P) provided by the spring (4) on the inferior tank (I) in an homogenous way.

7. Device according claim 1, characterized in that whatever the form of the container, spring element (4) of variable shape exerts a constant pressure on the disc (3) which, by transmitting it to the tank (I), enables the dispatch of under pressure liquid in the distribution circuit, which pressure diminishes gradually as the liquid is distributed (5).

8. Device according to claim 1, characterized in that the inferior tank (I) which is made of an elastic substance, which is tight, and which is balloon like shaped, is fixed up at the level of the bladder through a passage situated in the inferior part of the container (container 1).

9. Device according to claim 1, characterized in that the coupling (7) links the inferior tank (I), through its bladder and the passage (1) to the distribution piping (10) to the over pressure valve (9) and to the non return coupling (8).

10. Device according to claim 1, characterized in that the circuit of distribution, constituted of a distribution sluice, a pressure regulator and a piping allows a regular flow when the tap is opened.

11. Device according to claim 1, characterized in that the recuperation of used or added liquid, is done by gravity through evacuation ducts leading to the hose (13) inserted in the orifice of the lid (2), in the superior tank (S), by increasing the volume, which takes the place of the expulsed volume from the inferior tank (I).

12. Device according to claim 1, characterized in that the lid (2) has a form and a structure including of an orifice in which is connected the hose (13), a support where a valve is fixed up (6) and a quick lock system on the body (1) providing access to different elements of the container.

13. Device according to claim 1, characterized in that the non return valve (6) sealing the orifice of the lid (2) has a pointer which enables its opening and its closure the pointer enabling the liquid (14) to penetrate into the tank (S), being pushed by the hose during connection thereof with the lid, and enables the emptying of the superior tank (S), when the container is detached, being pushed by the far end of the receiving tank after turnover.

14. Device according to claim 1, characterized in that the body (1) has an orifice in its inferior part, through which the bladder (I) is fixed, and a neck in its superior part to provide a support to put into position the tank (S) and a lock means system with the lid (2).

15. Device according to claim 1, characterized in that the replenishment of the inferior tank (I) is done by connecting to the coupling (8) a source of liquid under a pressure superior to (P), which replenishment is attained when the over pressurized valve (7) opens up to let surplus liquid slip out.

* * * * *